Feb. 6, 1968 R. MAINHARDT 3,367,113
INTERNALLY CUT ROCKET NOZZLE
Filed Oct. 18, 1965
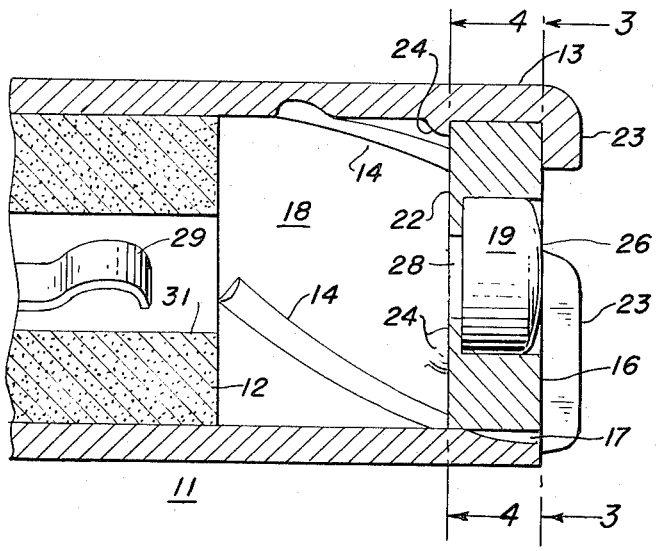
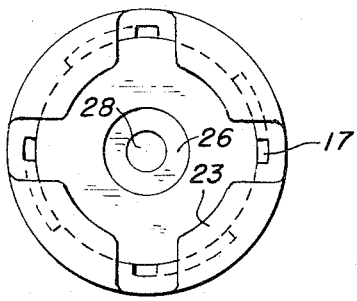
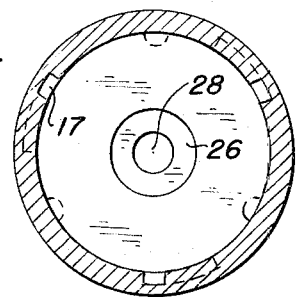
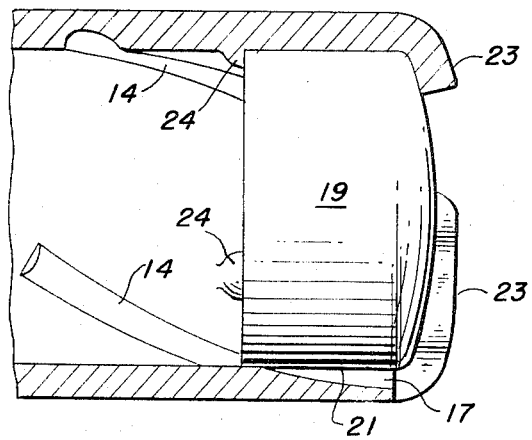
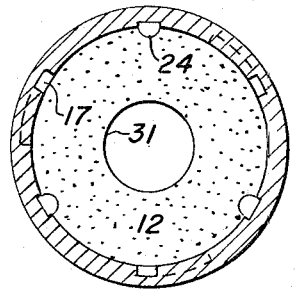
INVENTOR
ROBERT MAINHARDT
BY
Edwin E. Greigg
ATTORNEY

United States Patent Office 3,367,113
Patented Feb. 6, 1968

3,367,113
INTERNALLY CUT ROCKET NOZZLE
Robert Mainhardt, Diablo, Calif., assignor to MB Associates, a corporation of California
Filed Oct. 18, 1965, Ser. No. 496,907
2 Claims. (Cl. 60—201)

ABSTRACT OF THE DISCLOSURE

The invention relates to a rocket construction in which the interior wall of the rear end of the casing is provided with longitudinally extending grooves that together with the perimeter of the nozzle are arranged to control the flow of gases to spin stabilize the rocket.

---

This invention relates to rocket nozzles. More particularly, it relates to a nozzle for imparting spin to a miniature spin stabilized rocket.

Rockets too small to utilize internal guidance or stabilization systems are usualy guided to traverse a desired trajectory in one of two ways; they are gyroscopically spin stabilized or they are aerodynamically stabilized by tail fins. The latter means, if fixed fins are used, depends upon a constant oscillation or "hunting" during flight which is a characteristic that causes inaccuracy. This is explainable from basic principles of aerodynamics. When a finned rocket is aligned with the flight path, the center of pressure effected by drag and air resistance is located directly on the nose of the rocket forward of the center of gravity. This creates an inherently unstable condition and the rocket tends to deviate from the line of flight. As the nose swings out of alignment, the exposed frontal area, rearward of the center of gravity, causes the center of pressure to shift from the nose, rearward, to the finned surfaces. The resulting effective pressure on the fins forces the tail back in line behind the nose. The center of pressure then shifts forward to the nose creating the inherently unstable condition once again and starts the cycle over. This continuous transition from stable to unstable flight effects a "hunting" condition which exists throughout the flight of a finned rocket.

Spin stabilized rockets, on the other hand, depend upon gyroscopic inertia to maintain their flight trajectory. The principle is the same as used by large sized rockets having internal guidance systems, but instead of an internal spinning gyroscope varying the attitude flight control surfaces, or the individual rocket nozzles, the whole rocket spins with gyroscopic stability. For very small sized rockets having relatively short range, gyroscopic spin effects a more accurate trajectory than aerodynamic stabilization. Thus, if accurary in a very small sized rocket (on the order of 9/16 to 1 inch in diameter) is an important criterion, it is desirable to provide spin stabilization. This is especially true of the rockets are to be used for anti-personnel use.

A high rate of angular rotation is necessary to stabilize miniature rockets. A major problem in achieving this lies in providing nozzles, or exhaust deflecting means, which will provide the necessary spin rates with the proper angular and linear acceleration characteristics and thrust pulse.

One means for producing the required spin involves utilizing a nozzle configuration which has a multiplicity of canted nozzle ports spaced around the axis of spin in the rear nozzle plate. They work well if designed properly, but most successful designs have generally been very expensive to produce. These canted ports have been made by such processes as drilling, reaming, and multistep metal swaging; each having its particular advantages. However, when dealing with very small diameter spin stabilized rockets, the diameter of the casing limits the transverse cross-sectional area at the rear plate which is available for forming the nozzle ports. In fact, in the smaller sizes, the smallest available percussion primers would occupy virtually all of the available space in the rear plate thereby actually precluding the usage of standard nozzle ports. Since it is difficult to effect smaller sized reliable primers, it is necessary to redesign the nozzle ports.

The present invention is a rocket nozzle for spin stabilized solid propellant rockets in which the nozzle ports can be formed accurately, uniformly, and very inexpensively, in very small diameter rockets, and it offers a solution to the problems existent theretofore in the prior art of providing nozzles for such small rockets. (On the order of ¼ inch in diameter and less.) Briefly, it comprises a generally cylindrical hollow casing having an open rear end; at least two identical grooves cut longitudinally in the internal surface of the casing spaced equidistant from each other; and a nozzle plate secured in the rear end of the casing covering a portion of the exposed longitudinal length of the grooves forming constricted passages for exhausting the gases of combustion developed in the rocket motor.

It is therefore an important object of the present invention to provide a nozzle port for very small diameter rockets.

It is another object of the present invention to provide a nozzle port particularly adaptable to small diameter spin stabilized rockets.

It is a further object of the present invention to provide a nozzle for spin stabilized rockets which can easily be made of a diverging transverse cross section, or of a spiral configuration, or both in combination.

Other objects of the invention will become apparent from the following description of a preferred embodiment of the same taken in conjunction with the accompanying drawing wherein:

FIGURE 1 is an end view in elevation of the present invention;

FIGURE 2 is a side elevation in section of the present invention taken along line 2—2 of FIGURE 1;

FIGURE 3 is an end view in section taken along line 3—3 of FIGURE 2;

FIGURE 4 is an end view in section taken along line 4—4 of FIGURE 2;

FIGURE 5 is a side elevation in section of an alternative embodiment of the present invention.

Reference is made to the drawings for details of the present invention in a preferred form:

FIGURE 1 shows in section a rocket casing 11 with the solid propellant fuel slug 12 located in the forward portion thereof and with the casing having a rear end 13. At least two identical grooves 14 are cut longitudinally in the internal surface of the casing. They are symmetrically aligned and spaced equidistant from each other. These grooves in combination with a nozzle plate 16 form ports 17 for exhausting the gases of combustion. At least two coacting nozzle ports are necessary but three or four port nozzles have proven to be more satisfactory as more ports tend to balance out any unevenness in the flow of the exhausting combustion gases. Irrespective of the number of ports utilized, they are spaced equally and symmetrically around the interior wall 18 of the rocket casing 11 to provide balanced thrust.

The nozzle plate 16 is secured in the rear end of the casing and covers a portion of the exposed longitudinal length of the grooves. The effect of the nozzle plate and covered grooves is to provide constricted passages for the exhausting gases of combustion. In the very small sizes, the bore primer 19 can be inserted and secured in the rear end of the rocket casing and is the nozzle plate (FIGURE 5). The external walls 21 of the primer provide the cover or side to the grooves creating the constricted passages.

The grooves can be formed with an increasing transverse cross section rearward of the forward edge 22 of the nozzle plate 16. This arrangement provides a nozzle port 17 formed between the plate and edges of the grooves which is of a diverging nature and thereby forms a nozzle with diverging parts. Most important, the grooves can be cut in a spiral configuration (FIGURE 2) on the internal surface 18 of the casing. The spiral effects the angular reaction moment which causes the rocket to spin as a result of the gases combustion exhausting through the ports.

The nozzle plate 16 is secured in the rear end of the casing or body 11 by tabs 23 formed on the rearward edge of the rocket casing in a scalloped arrangement. These tabs 23 are bent radially inward around the circumference of the rear end of the casing between the ports 17 formed by the grooves 14. These overlapping portions of the casing secure the nozzle plate against movement. Small portions of deformed metal 24, scraped from a thin layer of the internal wall of the casing, form the spacing means in the rocket for positioning the nozzle plates relative to the rear end of the casing. The metal from the grooves 14 forms a spacing means for positioning the propellant grain in the casing relative to the nozzle plate.

After the rocket is completely assembled, it can be run through a sizing die to provide truly cylindrical projectiles and to seal the case around the nozzle plate (except of course at the grooves).

The grooves 14 and spacing means 24 can be formed in the same cutting operation. A broach is utilized which cuts the grooves in the internal surface of the casing and simultaneously scrapes a small amount of the surface metal between the broached grooves to provide a small deformed amount of metal as spacing means 24 for positioning the nozzle plate. Other means can be utilized for the spacing means such as a transverse ridge extending around the internal surface.

A primer cavity 26 is provided in the nozzle plate for a percussion primer 19 which, when struck by a firing pin, supplies a blast of heat and hot gas through the port 27 to light up the igniter 29 which uniformly ignites the propellant 12 along its bore 31.

FIGURE 5 shows an alternative embodiment of the invention utilizing a percussion primer as the nozzle plate.

It can be seen from the foregoing description of the invention how the nozzle ports, when arranged in the casing wall, can permit a much smaller diameter rocket than heretofore possible. It will also be apparent that the invention, in its preferred form, will fulfill all the objects attributable thereto, and while it has been illustrated and described in considerable detail, protection is not to be limited to such details as has been illustrated and described except as may be necessitated by the appended claims.

I claim:

1. A nozzle for a spin stabilized solid propellant miniature rocket comprising:
    a generally cylindrical hollow casing having an interior wall and a rear end portion,
    at least two identical grooves cut longitudinally in the internal surface of said casing spaced quidistant from each other and terminating at the rear end portion,
    a nozzle plate having a forward edge and a cylindrical perimeter arranged to contact the interior wall of said casing and secured in the rear end of said casing thus covering a portion of the exposed longitudinal length of said grooves,
    said grooves having an increasing transverse cross-section provided in the hollow casing rearward of the forward edge of said nozzle plate, whereby the gases are constricted in the passageways formed between the hollow casing and the perimeter of the nozzle to thereby spin stabilize the rocket as the gases discharge through the increasing transverse cross-section at the trailing end of said rocket casing.

2. The nozzle of claim 1 including spacing means for positioning said nozzle plate relative to the rear end of said casing.

References Cited

UNITED STATES PATENTS 2,524,591  10/1950  Chandler _____ 60—201

FOREIGN PATENTS 580,598  9/1924  France.
166,258  7/1921  Great Britain.

CARLTON R. CROYLE, *Primary Examiner.*